US012068819B2

(12) United States Patent
Pedersen et al.

(10) Patent No.: US 12,068,819 B2
(45) Date of Patent: Aug. 20, 2024

(54) ANTENNA PANEL SWITCHING IN TELECOMMUNICATION SYSTEMS

(71) Applicant: NOKIA TECHNOLOGIES OY, Espoo (FI)

(72) Inventors: Klaus Ingemann Pedersen, Aalborg (DK); István Zsolt Kovács, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 53 days.

(21) Appl. No.: 18/003,309

(22) PCT Filed: Jun. 2, 2021

(86) PCT No.: PCT/EP2021/064766
§ 371 (c)(1),
(2) Date: Dec. 23, 2022

(87) PCT Pub. No.: WO2021/259605
PCT Pub. Date: Dec. 30, 2021

(65) Prior Publication Data
US 2023/0254019 A1    Aug. 10, 2023

(30) Foreign Application Priority Data
Jun. 25, 2020    (GB) ..................... 2009702

(51) Int. Cl.
*H04B 7/06*    (2006.01)
*H01Q 3/24*    (2006.01)
(Continued)

(52) U.S. Cl.
CPC ............. *H04B 7/0602* (2013.01); *H01Q 3/24* (2013.01); *H04B 7/0404* (2013.01); *H04B 7/0802* (2013.01)

(58) Field of Classification Search
CPC .. H04B 7/0602; H04B 7/0404; H04B 7/0802; H01Q 3/24
See application file for complete search history.

(56) References Cited

U.S. PATENT DOCUMENTS 11,917,689 B2 *   2/2024   Ly ............................. H04L 1/08
11,943,030 B2 *   3/2024   Yu ........................... H04B 7/088
(Continued)

OTHER PUBLICATIONS

International Search Report and Written Opinion for International Application No. PCT/EP2021/064766, mailed Jul. 21, 2021, 13 pages.
(Continued)

*Primary Examiner* — Freshteh N Aghdam
(74) *Attorney, Agent, or Firm* — Barta Jones, PLLC (57) ABSTRACT

An apparatus, method and computer program is described comprising: receiving antenna panel switching rate configuration parameters; determining an antenna panel switching rate at a user device of a communication system, wherein the antenna panel switching rate is based on a number of antenna panel switching events within a moving averaging window, wherein the window has a size defined by said configuration parameters; and providing a panel switching rate report to a network node of the communication system, wherein the panel switching rate report includes the determined antenna panel switching rate.

15 Claims, 7 Drawing Sheets

(51) Int. Cl.
*H04B 7/0404* (2017.01)
*H04B 7/08* (2006.01)

(56) References Cited

U.S. PATENT DOCUMENTS

| | | |
|---|---|---|
| 2013/0095869 A1 | 4/2013 | Christoffersson et al. |
| 2020/0106168 A1 | 4/2020 | Hakola et al. |
| 2021/0168714 A1* | 6/2021 | Guan .................... H04W 52/16 |
| 2021/0281301 A1* | 9/2021 | Takano ................ H04B 7/0695 |
| 2021/0336333 A1* | 10/2021 | Yang ........................ H01Q 3/24 |
| 2022/0166482 A1* | 5/2022 | Yu ........................ H04B 1/0458 |
| 2022/0337298 A1* | 10/2022 | Li ........................ H04B 7/0608 |

OTHER PUBLICATIONS

3GPP TSG RAN WG1 Meeting #97, R1-1907531; "Discussion on panel activation/deactivation status"; Source: Huawei, HiSilicon; Reno, Nevada, USA; May 13-17, 2019; 2 pages.

\* cited by examiner

Fig. 12B

ANTENNA PANEL SWITCHING IN TELECOMMUNICATION SYSTEMS

CROSS-REFERENCE TO RELATED APPLICATIONS

This application is a national stage entry of International Application No. PCT/EP2021/064766, filed Jun. 2, 2021, entitled "ANTENNA PANEL SWITCHING IN TELECOMMUNICATION SYSTEMS" which claims the benefit of priority of United Kingdom Application No. GB 2009702.8, filed Jun. 25, 2020, both of which are hereby incorporated by reference in their entireties.

FIELD

This specification relates to antenna panel switching.

BACKGROUND

User devices in communication systems may have multiple antenna panels. In many circumstances, such user devices are restricted to having only one antenna panel active at any one time. There remains a need for further developments in this field.

SUMMARY

In a first aspect, this specification describes an apparatus (e.g. a user device) comprising means configured to perform: receiving (e.g. from a network node, such as a base station or a gNB) antenna panel switching rate configuration parameters; determining an antenna panel switching rate at a user device of a communication system, wherein the antenna panel switching rate is based on a number of antenna panel switching events within a moving averaging window, wherein the window has a size defined by said configuration parameters; and providing a panel switching rate report to a network node of the communication system, wherein the panel switching rate report includes the determined antenna panel switching rate. The size of the window may be defined in terms of a duration (e.g. a number of seconds), a number of radio frames or some other time measurement.

In some example embodiments, the means configured to provide the panel switching rate report provides said report in response to a panel switching rate request from the network node.

In some example embodiments, the means configured to provide the panel switching rate report provides said report in the event that a beam failure recovery or a reestablishment attempt is initiated. This may be useful since the panel switching rate may be a good indicator of beam failure.

The panel switching rate report may identify a most recently used user device antenna panel and/or a most frequently used user device antenna panel. The most frequently used panel may be the panel used for the largest aggregate duration over a defined period.

The apparatus may further comprise means configured to perform determining whether to continue to determine the antenna panel switching rate during an idle mode of operation, depending on an idle mode configuration setting. The idle mode configuration setting may be provided as part of the panel switching rate configuration parameters. The apparatus may further comprise means configured to perform providing the panel switching rate report to the network node (e.g. a gNB) on exiting said idle mode of operation.

The antenna panel switching rate configuration parameters may include one or more reporting requirements, wherein the respective user device is instructed to send a panel switching rate report in the event that one or more of said reporting requirements are met.

The apparatus may further comprise means configured to perform setting a user device preferred panel identifier to a most frequently used antenna panel for the respective user device.

In a second aspect, this specification describes an apparatus (such as a base station or a gNB) comprising means configured to perform: providing antenna panel switching rate configuration parameters to one or more user devices of a communication system, wherein said configuration parameters include a moving averaging window size (e.g. a number of second, number of radio frames or some other time measurement) during which window a number of antenna panel switching events is to be counted at the respective user device; and receiving one or more panel switching rate reports from one or more of said user devices, wherein each panel switching rate report includes a determined antenna panel switching rate for the respective user device.

The apparatus may further comprise means configured to perform determining whether action is required in response to said one or more received panel switching rate reports. Such action may include, for example increasing a beam width if panel switching rate is high for the respective user device.

The apparatus may further comprise means configured to perform sending a panel switching rate report request to one or more of said one or more user devices.

The apparatus may further comprise means configured to perform instructing one or more of said user devices to continue to determine the antenna panel switching rate during an idle mode of operation.

The apparatus may further comprise means configured to set parameters for a communication link with one of said one or more user devices based on received antenna panel switching rate information from the respective user device. For example, the parameters for the communication link include one or more of: scaling of parameters for RRM measurement objects; settings for beam management procedures; and hysteresis values; and timing parameters of RRM measurement objects.

The antenna panel switching rate configuration parameters may include one or more reporting requirements, wherein the respective user device is instructed to send a panel switching rate report in the event that one or more of said reporting requirements are met. The reporting requirements may, for example, include periodic reporting requirements or event-based reporting requirements (e.g. if a panel switching rate is above a threshold or if a change in the panel switching rate is above a threshold).

The apparatus may further comprise means configured to perform setting a user device preferred panel identifier to a most frequently used antenna panel for the respective user device.

In the first and second aspects described above, the means may comprise: at least one processor; and at least one memory including computer program code, the at least one memory and the computer program configured, with the at least one processor, to cause the performance of the apparatus.

In a third aspect, this specification describes a message sequence comprising: antenna panel switching rate configuration parameters provided from a network node of a communication system to a user device of the communication system, wherein said configuration parameters include a moving averaging window size during which window a number of antenna panel switching events is to be counted at the user device; determining an antenna panel switching rate at the user device, wherein the antenna panel switching rate is based on a number of antenna panel switching events within a moving averaging window having a size defined by said configuration parameters; and providing a panel switching rate report from the user device to the network node, wherein the panel switching rate report includes the determined antenna panel switching rate. The antenna panel switching rate configuration parameters may include one or more reporting requirements, wherein the respective user device is instructed to send a panel switching rate report in the event that one or more of said reporting requirements are met.

The panel switching rate report may be provided in response to a panel switching rate request from the network node. Alternatively, or in addition, the panel switching rate report may be provided in the event that a beam failure recovery or a reestablishment attempt is initiated. Alternatively, or in addition, the panel switching rate report may be provided on exiting of an idle mode of operation.

In a fourth aspect, this specification describes a method comprising: receiving (e.g. from a network node, such as a base station or a gNB) antenna panel switching rate configuration parameters; determining an antenna panel switching rate at a user device of a communication system, wherein the antenna panel switching rate is based on a number of antenna panel switching events within a moving averaging window, wherein the window has a size defined by said configuration parameters; and providing a panel switching rate report to a network node of the communication system, wherein the panel switching rate report includes the determined antenna panel switching rate. The size of the window may be defined in terms of a duration (e.g. a number of seconds), a number of radio frames or some other time measurement.

The panel switching rate report may be provided in response to a panel switching rate request from the network node. Alternatively, or in addition, the panel switching rate report may be provided in the event that a beam failure recovery or a reestablishment attempt is initiated.

The panel switching rate report may identify a most recently used user device antenna panel and/or a most frequently used user device antenna panel. The most frequently used panel may be the panel used for the largest aggregate duration over a defined period.

The method may comprise determining whether to continue to determine the antenna panel switching rate during an idle mode of operation, depending on an idle mode configuration setting. The idle mode configuration setting may be provided as part of the panel switching rate configuration parameters. The method may further comprise providing the panel switching rate report to the network node (e.g. a gNB) on exiting said idle mode of operation.

The antenna panel switching rate configuration parameters may include one or more reporting requirements, wherein the respective user device is instructed to send a panel switching rate report in the event that one or more of said reporting requirements are met.

The method may comprise setting a user device preferred panel identifier to a most frequently used antenna panel for the respective user device.

In a fifth aspect, this specification describes a method comprising: providing antenna panel switching rate configuration parameters to one or more user devices of a communication system, wherein said configuration parameters include a moving averaging window size (e.g. a number of second, number of radio frames or some other time measurement) during which window a number of antenna panel switching events is to be counted at the respective user device; and receiving one or more panel switching rate reports from one or more of said user devices, wherein each panel switching rate report includes a determined antenna panel switching rate for the respective user device.

The method may comprising determining whether action is required in response to said one or more received panel switching rate reports. Such action may include, for example increasing a beam width if panel switching rate is high for the respective user device.

The panel switching rate report request may be sent to one or more of said one or more user devices.

The method may comprise instructing one or more of said user devices to continue to determine the antenna panel switching rate during an idle mode of operation.

Parameters for a communication link with one of said one or more user devices may be set based on received antenna panel switching rate information from the respective user device. For example, the parameters for the communication link include one or more of: scaling of parameters for RRM measurement objects; settings for beam management procedures; and hysteresis values; and timing parameters of RRM measurement objects.

The antenna panel switching rate configuration parameters may include one or more reporting requirements, wherein the respective user device is instructed to send a panel switching rate report in the event that one or more of said reporting requirements are met. The reporting requirements may, for example, include periodic reporting requirements or event-based reporting requirements (e.g. if a panel switching rate is above a threshold or if a change in the panel switching rate is above a threshold).

The method may comprise setting a user device preferred panel identifier to a most frequently used antenna panel for the respective user device.

In a sixth aspect, this specification describes an apparatus configured to implement (at least) any message sequence as described with reference to the third aspect or to perform (at least) any method as described with reference to the fourth or fifth aspects.

In a seventh aspect, this specification describes computer-readable instructions which, when executed by computing apparatus, cause the computing apparatus to implement (at least) any message sequence as described with reference to the third aspect or to perform (at least) any method as described with reference to the fourth or fifth aspects.

In an eighth aspect, this specification describes a computer-readable medium (such as a non-transitory computer-readable medium) comprising program instructions stored thereon for performing (at least) any message sequence as described with reference to the third aspect or to perform (at least) any method as described with reference to the fourth or fifth aspects.

In a ninth aspect, this specification describes an apparatus comprising: at least one processor; and at least one memory including computer program code which, when executed by the at least one processor, causes the apparatus to perform (at least) any message sequence as described with reference to the third aspect or to perform (at least) any method as described with reference to the fourth or fifth aspects.

In a tenth aspect, this specification describes a computer program comprising instructions for causing an apparatus to perform at least the following: receiving (e.g. from a network node, such as a base station or a gNB) antenna panel switching rate configuration parameters; determining an antenna panel switching rate at a user device of a communication system, wherein the antenna panel switching rate is based on a number of antenna panel switching events within a moving averaging window, wherein the window has a size defined by said configuration parameters; and providing a panel switching rate report to a network node of the communication system, wherein the panel switching rate report includes the determined antenna panel switching rate. The size of the window may be defined in terms of a duration (e.g. a number of seconds), a number of radio frames or some other time measurement.

In an eleventh aspect, this specification describes a computer program comprising instructions for causing an apparatus to perform at least the following: providing antenna panel switching rate configuration parameters to one or more user devices of a communication system, wherein said configuration parameters include a moving averaging window size (e.g. a number of second, number of radio frames or some other time measurement) during which window a number of antenna panel switching events is to be counted at the respective user device; and receiving one or more panel switching rate reports from one or more of said user devices, wherein each panel switching rate report includes a determined antenna panel switching rate for the respective user device.

In a twelfth aspect, this specification describes an apparatus comprising: means (such as a input of a control module) for receiving (e.g. from a network node, such as a base station or a gNB) antenna panel switching rate configuration parameters; means (such as a counter) for determining an antenna panel switching rate at a user device of a communication system, wherein the antenna panel switching rate is based on a number of antenna panel switching events within a moving averaging window, wherein the window has a size defined by said configuration parameters; and means (such as an output of a control module) for providing a panel switching rate report to a network node of the communication system, wherein the panel switching rate report includes the determined antenna panel switching rate.

In a thirteenth aspect, this specification describes an apparatus comprising: means (such as a control module) for providing antenna panel switching rate configuration parameters to one or more user devices of a communication system, wherein said configuration parameters include a moving averaging window size (e.g. a number of second, number of radio frames or some other time measurement) during which window a number of antenna panel switching events is to be counted at the respective user device; and means (such as a processor) for receiving one or more panel switching rate reports from one or more of said user devices, wherein each panel switching rate report includes a determined antenna panel switching rate for the respective user device.

BRIEF DESCRIPTION OF THE DRAWINGS

Example embodiments will now be described, by way of non-limiting examples, with reference to the following schematic drawings.

DETAILED DESCRIPTION

The scope of protection sought for various embodiments of the invention is set out by the independent claims. The embodiments and features, if any, described in the specification that do not fall under the scope of the independent claims are to be interpreted as examples useful for understanding various embodiments of the invention.

In the description and drawings, like reference numerals refer to like elements throughout.

Figure 1:
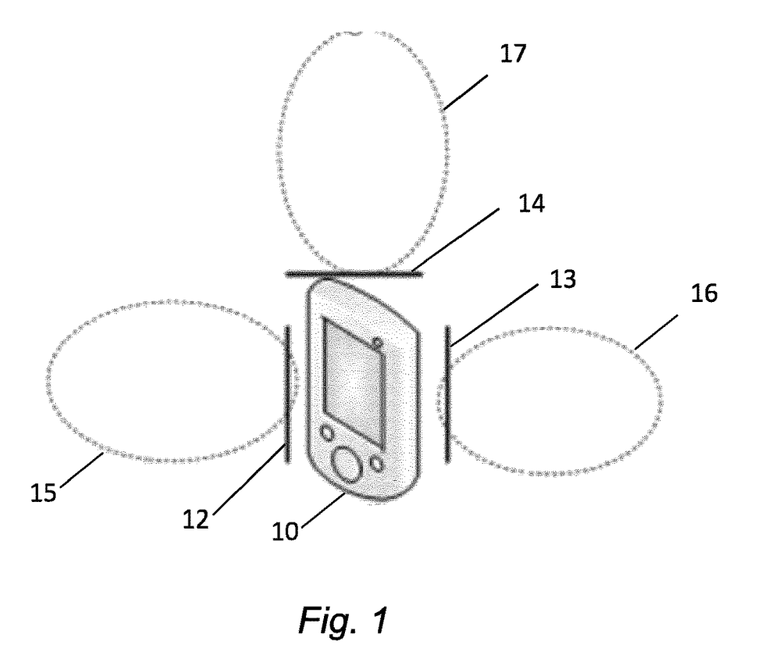
FIG. 1 is a block diagram of a user device in accordance with an example embodiment.

FIG. 1 is a block diagram of a user device 10 in accordance with an example embodiment. The user device 10 has multiple antenna panels. By way of example, the user device 10 includes a first antenna panel 12, a second antenna panel 13 and a third antenna panel 14. Of course, any particular user device could have more or fewer than three antenna panels.

The user device 10 may, for example be used in 5G New Radio (NR) operations in which the user device (i.e. UEs) have multiple antenna panels, but may operate under the restriction that they only have one of those antenna panels active at any particular time. This may be advantageous as it is costly (both from a hardware complexity and energy consumption point of view) to have user devices operate with multiple simultaneously active antenna panels. For example, NR FR2 use cases (e.g. NR at 28 GHz) exist in which UEs have multiple panels (e.g. three to four antenna panels), but the principles described here are, for course, applicable to other frequency regions (e.g. FR1 and FR4). The principles described herein have relevance for 3GPP Rel-17, and also Rel-18 and beyond.

As shown in FIG. 1, the user device 10 has three antenna panels 12, 13 and 14. Each antenna panel have a directional radiation pattern that points in different spatial directions as illustrated in FIG. 1. Thus, the first antenna panel 12 has a first radiation pattern 15, the second antenna panel 13 has a second radiation pattern 16, and the third antenna panel 14 has a third radiation pattern 17, Each antenna panel may be an antenna array, using digital, analogue, or hybrid beamforming techniques for communication with its serving cell. The user device 10 may be subject to time-variant rotations, and there may be time-variant local scattering and/or blockage taking place; e.g. including a hand on a terminal that changes position. In the example embodiments described below, it is generally assumed that the user device 10 is implemented such that typically only one antenna panel is active (TX/RX) per time-instant, but other schemes, where several antenna panels can be active simultaneously in RX and/or TX are not precluded.

The user device 10 may seek to use the best antenna panel for reception and/or transmission towards a serving cell by performing measurements on its other antenna panels. For example, measurements may be performed on SSB and/or CSI-RS transmitted from beams belonging to its serving cell.

Whether a user device performs antenna panel switching (e.g. changing which panel is the best one for the UE to communicate with its serving cell), has implications, such as:

- A user device panel switching may trigger beam switching at the network (e.g. base station/gNB) side.
- User device panel switching may trigger new beamforming actions at the user device, and hence the need for new beam alignment between the base station and user device side.
- If user device panel switches happen very fast, maintaining effective beam correspondence (alignment) between the user device and the relevant base station becomes difficult, especially if using narrow beams.
- Maintaining good radio connectivity becomes more challenging if the user device panel switching rate is high (i.e. effectively corresponding to changing the sectorization/radiation pattern of the user device often).

As discussed in detail below, a panel switching rate can be determined at a user device and reported to the network. The network may, for example, optimize parameters for a communication link to such user device, and therefore improve performance.

Figure 2:
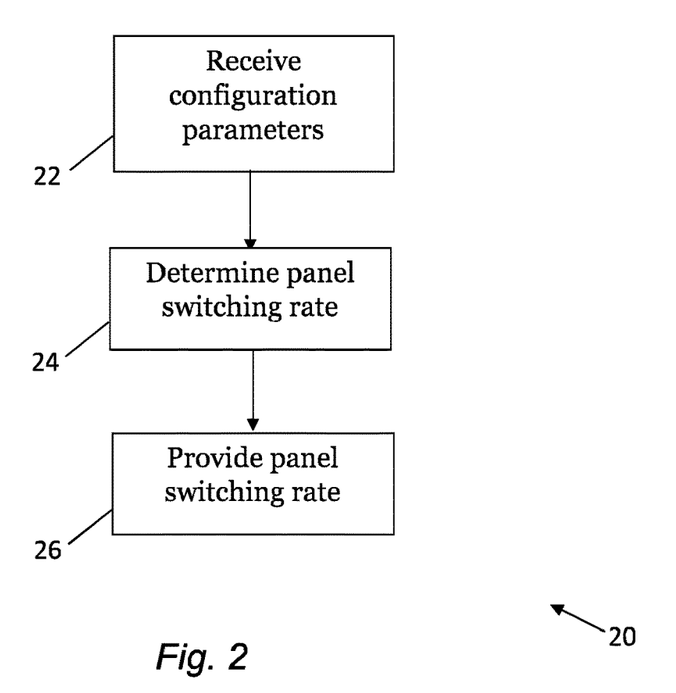
FIG. 2 is a flow chart showing an algorithm in accordance with an example embodiment.

FIG. 2 is a flow chart showing an algorithm, indicated generally by the reference numeral 20, in accordance with an example embodiment. The algorithm 20 may be implemented at the user device 10.

At operation 22, the user device 10 receives panel switching rate configuration parameters, for example from a network node (e.g. a base station or gNB) of a communication system.

At operation 24, a panel switching rate is determined at the user device. The panel switching rate may be based on a number of antenna panel switching events within a moving averaging window. The window may have a size (e.g. a number of a seconds, a number of radio frames or some other time measurement) defined by the configuration parameters received in the operation 22.

At operation 26, a panel switching rate report is provided to the network node of the communication system. The panel switching rate report includes the panel switching rate determined in the operation 24.

Figure 3:
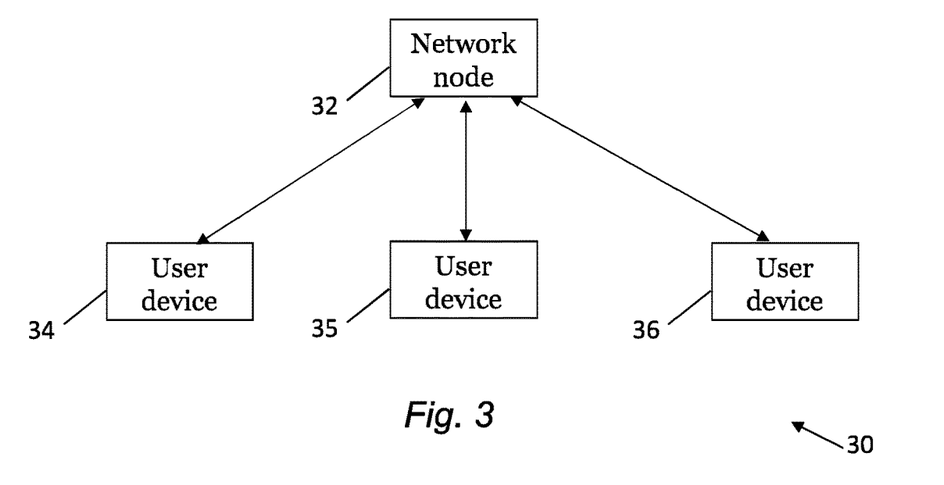
FIG. 3 is a block diagram of a system in accordance with an example embodiment.

FIG. 3 is a block diagram of a system, indicated generally by the reference numeral 30, in accordance with an example embodiment. The system 30 comprises a network node 32 (e.g. a base station or gNB), a first user device 34, a second user device 35 and a third user device 36. The network node is in two-way communication with each of the first to third user devices 34 to 36.

In the system 30, each of the user devices 34 to 36 may implement the algorithm 20 and provide panel switching data, for the respective user device, to the network node 32. On the basis of the received panel switching data, the network node 32 may seek to improve communications between the network node and the user devices.

Figure 4:
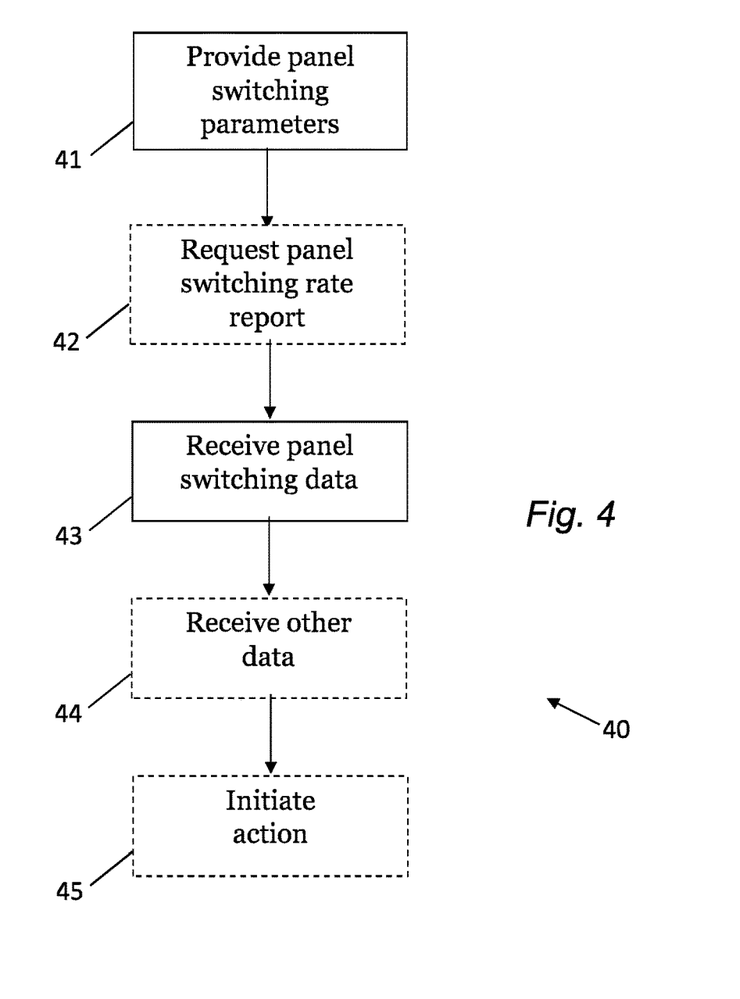
FIG. 4 is a flow chart showing an algorithm in accordance with an example embodiment.

FIG. 4 is a flow chart showing an algorithm, indicated generally by the reference numeral 40, in accordance with an example embodiment. By way of example, the algorithm 40 may be implemented at the network node 32, but this is not essential to all example embodiments.

The algorithm 40 starts at operation 41, where panel switching rate configuration parameters are provided by the network node 32 to one or more (e.g. all) of the user devices 34 to 36. The configuration parameters may include a parameter that defines a moving averaging window size during which window a number of antenna panel switching events is to be counted at the respective user device. The window size may be defined as a time period (e.g. a number of seconds), as a number of frames (e.g. radio frames) or in some other way. The configuration parameters provided in the operation 41 may include one or more reporting requirements, wherein the respective user device is instructed to send a panel switching rate report in the event that one or more of said reporting requirements are met.

In some example embodiments, the switching parameters provided in the operation 41 may be changed only infrequently, if at all.

In some example embodiments, the switching parameters provided in the operation 41 may be based on information such as one or more of: user device capabilities, past user device radio conditions, past user device measurement reports, beam failure rates based on previous panel switching parameters, information from other user devices, and non-radio user device information (such as location or movement etc.). The skilled person will be aware of other information that may be used for setting switching parameters in addition to, or instead of, the options outlined above.

At operation 42, in the event that the network node 32 wants to know a panel switching rate of a particular user device, a panel switching rate report request may be sent from the network node to the respective user device. As discussed further below, panel switching rate reports may be triggered in other ways, such that operation 42 is optional is some example embodiments.

At operation 43, panel switching data is received at the network node 32 from one or more of the user devices 34 to 36 (e.g. in response to a request sent in the operation 42). The panel switching data may be provided in one or more panel switching rate reports sent from the respective user device to the network node.

The network node 32 may receive other data, in additional to the panel switching data, in optional operation 44 of the algorithm 40. The additional data may be provided together with the switching data. Alternatively, or in addition, the additional data may be provided separately.

At operation 45, the network node 32 may initiate action in response to received panel switching rate report(s). The network node 32 may comprise means configured to perform determining whether any such action is required.

The actions that may be taken in the operation 45 may take many forms. For example, if a user device reports a high panel switching rate, the network node 32 may use wider beams to make the connection more robust, (e.g. less sensitive to frequent user device panel switching). Using wider beams may ease the task of network node and user device (e.g. gNb and UE) beam management, which becomes more challenging in the event of a high panel switching rate. Alternatively, or in addition, the network node (e.g. gNB) may take other actions such as configuring different parameterizations for user device beam failure declaration and/or radio link failures. The latter can, for example, be used to supress that false/unecessary beam failures and/or radio link failures are triggered as a result of frequent user device antenna panel switches. Another action that might be initiated in the operation 45 is the setting of a user device preferred panel identifier to a most frequently used antenna panel for the respective user device.

Figure 5:
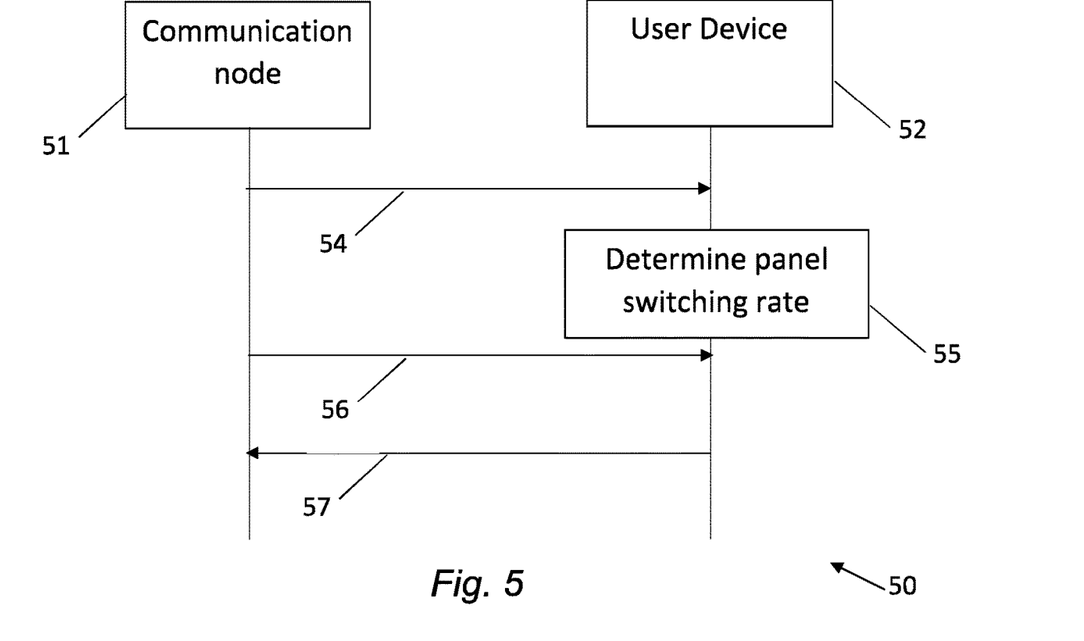
FIGS. 5 and 6 show message sequences in accordance with example embodiments.

FIG. 5 shows a message sequence, indicated generally by the reference numeral 50, in accordance with an example embodiment. The message sequence 50 shows messages between a communication node 51 (such as the network node 32 described above) and a user device 52 (such as one of the user devices 34 to 36 described above).

The message sequence 50 starts with the communication node 51 sending a first message 54 to the user device 52 providing panel switching rate configuration parameters to the user device 52. The message 54 is therefore an example implementation of the operation 41 described above.

The first message 54 may be implemented using RRC signaling. The first message 54 may include setting the length of a sliding averaging window, within which a number of antenna panel switches performed is to be counted. The configuration of the user device to perform panel switching rate monitoring may also include configuration of reporting conditions for the user device 52 to feedback panel switching rate reports. Such reporting conditions may be periodic reports or event based reports (e.g. if the panel switching rate become higher, or lower, than a threshold).

In response to the first message 54, the user device 52 determines a panel switching rate (in operation 55). A panel switch may be defined as the action taken where a user device switches to use a new antenna panel as its best panel for communication with its current serving cell (if in RRC Connected Mode) or camping cell (if in RRC IDLE mode).

Although a single instance of the operation 55 is shown in the message sequence 50, the operation 55 may be implemented repeatedly (e.g. periodically or in an ongoing manner) such that the panel switching rate is updated.

In the message sequence 50, the communication node 51 sends a second message 56 to the user device, requesting that the user device 52 sends a penal switching rate report to the communication node. Thus, the second message 56 is an example implementation of the operation 42 of the algorithm 40.

In response to the second message 56, the user device 52 sends a panel switching rate report to the communication node as part of a third message 57. The panel switching rate report may be the report generated in the most recent instance of the operation 55.

Figure 6:
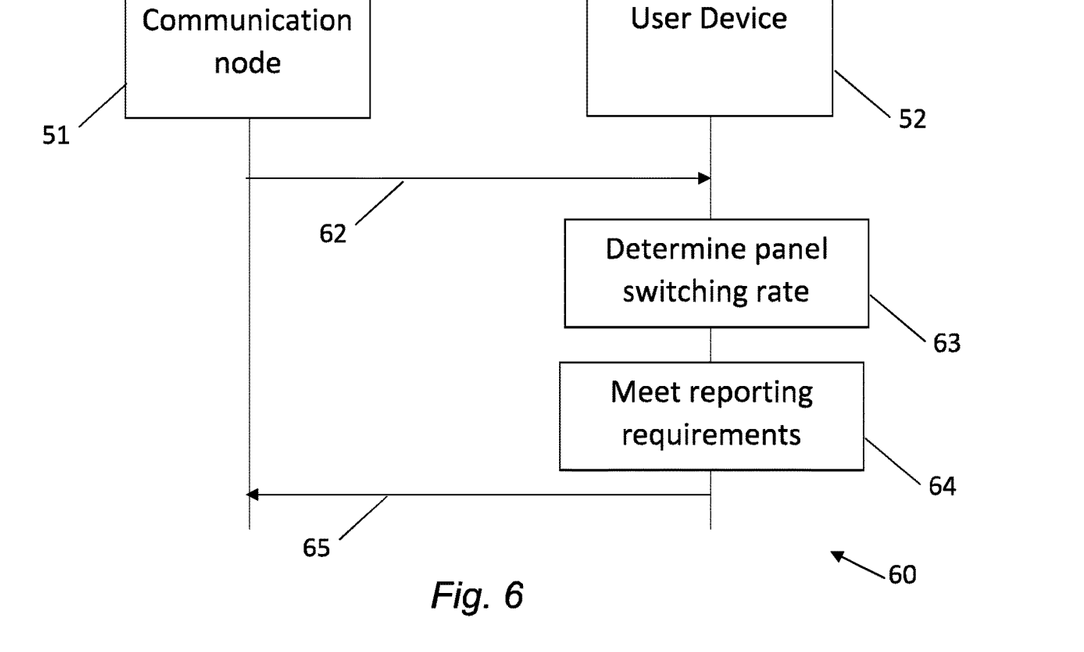

FIG. 6 shows a message sequence, indicated generally by the reference numeral 60, in accordance with an example embodiment. The message sequence 60 shows messages between the communication node 51 and the user device 52 and is an alternative implementation of the algorithm 50 described above.

The message sequence 60 starts with the communication node 51 sending a first message 62 to the user device 52 providing panel switching rate configuration parameters to the user device 52. The message 64 is therefore an example implementation of the operation 41 described above and may be similar to the first message 54 described above. The first message 62 may include one or more reporting requirements, wherein the user device 52 is instructed to send a panel switching rate report in the event that one or more of said reporting requirements are met. Such reporting requirements may include periodic reporting requirements and/or event-based reporting requirements (e.g. if a panel switching rate is above a threshold, or if a change in the panel switching rate is above a threshold).

In response to the first message 62, the user device 52 determines a panel switching rate (in operation 63). A panel switch may be defined as the action taken where a user device switches to use a new antenna panel as its best panel for communication with its current serving cell (if in RRC Connected Mode) or camping cell (if in RRC IDLE mode).

In the message sequence 60, the user device 52 determines whether panel switching rate reporting requirements (e.g. the requirements defined in the operation 51) have been met. If so, the user device 52 sends a panel switching rate report to the communication node as part of a second message 65. The panel switching rate report may be the most recent report generated in the operation 63.

Although single instances of the operations 63 and 64 are shown in the message sequence 60, one or both of those operations may be implemented repeatedly (e.g. periodically or in an ongoing manner). Moreover, the order in which those operations are carried out is shown only schematically in the message sequence 60—alternative configurations are possible.

Figure 7:
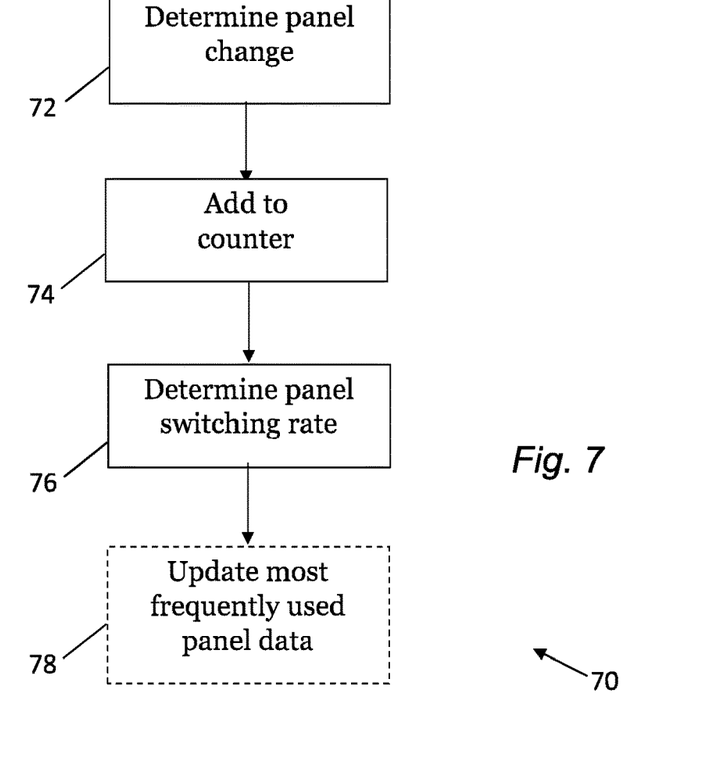
FIGS. 7 and 8 are flow charts showing algorithms in accordance with example embodiments.

FIG. 7 is a flow chart showing an algorithm, indicated generally by the reference numeral 70, in accordance with an example embodiment. The algorithm 70 may be implemented at one of the user devices 10, 34, 35, 36 and 52 described above.

The algorithm 70 starts at operation 72, where a change in an antenna panel used by the user device is determined. A panel switch may be defined as the action taken where a user device switches to use a new antenna panel as its best panel for communication with its current serving cell (if in RRC Connected Mode) or camping cell (if in RRC IDLE mode).

At operation 74, the determination of a panel change (in operation 72) results in a counter being incremented.

At operation 76, a panel switching rate is determined. The determination in operation 76 may be based on the number of increments of the counter during a panel switching monitoring time window.

At optional operation 78, a most frequently used (and/or a most recently used) antenna panel data may be updated. The most used antenna panel may be defined as the antenna pannel which was used for the longest aggregate time, or which experienced most use instances, during the configured user device panel switching monitoring time window.

In some example embodiments, the panel switching rate report includes identifiers (or indeces) of a most used (and/or most recently used) antenna panel by the respective user device. This information may be used by the network to collect information for a variety of purposes, such as estimating consistent/repetitive antenna pannel orientation (e.g. in case of an NTN UE for IoT UE with very determinisitc movement pattern vs. serving network), etc. The most used antenna panel may also be useful in scenarios where the device RF capabilities are restricted and the relative movement vs the serving network is deterministic.

Figure 8:
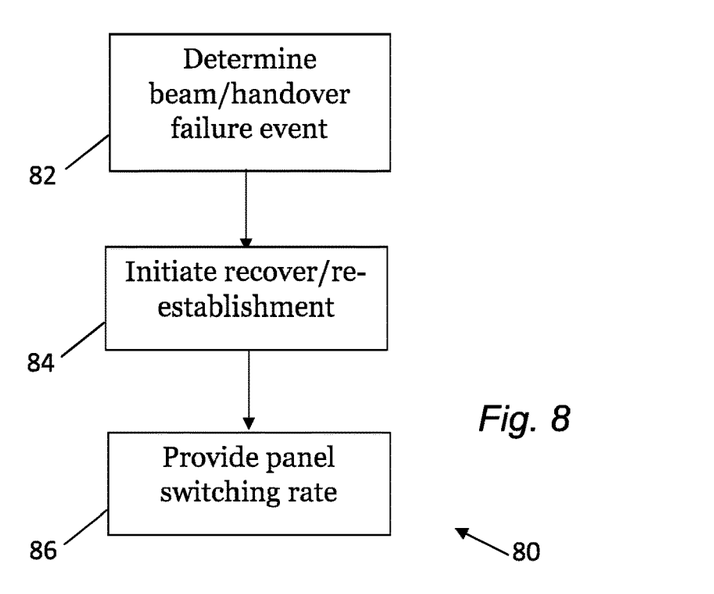

FIG. 8 is a flow chart showing an algorithm, indicated generally by the reference numeral 80, in accordance with an example embodiment.

The algorithm 80 starts at operation 82, where a beam failure event or a handover failure event is determined. The operation 82 may, for example, determine a failure in user device communications with a network node.

In response to the determination of a beam/handover failure in the operation 84, a recover or re-establishment of communications is initiated in the operation 84.

At operation 86, a panel switching rate is provided, which panel switching rate may be used as part of the recovery or re-establishment process. It should be noted that whilst the operation 86 is shown as a separate operation in the algorithm 80, the operations 84 and 86 may be combined into a single operation. As discussed further below, the panel switching rate may be a good indicator of beam failure. In the algorithm 80, the most recently recorded panel switching rate may be provided to the relevant network node.

By way of example, in accordance with the current MAC-specifications (3GPP TS 38.321), a user equipment (UE) may experience beam failure declaration, or RRC-based radio link failure declaration (3GPP TS 38.331). When such failures happen (and are detected in the operation 82 of the algorithm 80), the UE will attempt beam failure recovery and call re-establishment actions, respectively (thereby implementing the operation 84). In relation to such failures, the network may have the option to configure the UE to include its latest measurement of panel switching rate when it perform the recovery/re-establishment, or immediately after successful recovery/re-establishment. Having such functionality may provide useful information for the network to seek to diagnose the cause of the failure (beam failure or radio link failure). For example, if the UE reports a high panel switching rate, the network could consider, for example, reconfiguring some of the associated RRC/RRM parameters for the UE.

Figure 9:
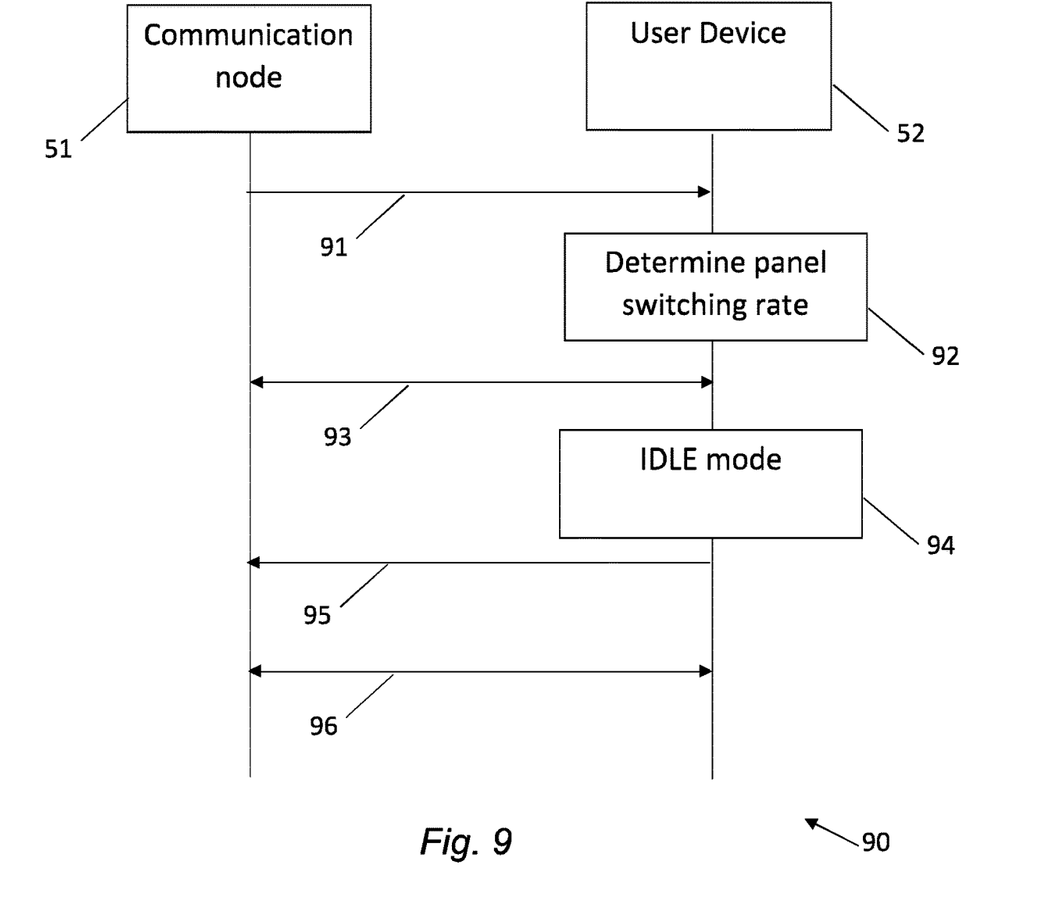
FIG. 9 shows a message sequence in accordance with an example embodiment.

FIG. 9 shows a message sequence, indicated generally by the reference numeral 90, in accordance with an example embodiment.

The message sequence 90 shows messages between the communication node 51 and the user device 52 described above.

The message sequence 90 starts with the communication node 51 sending a first message 91 (similar to the message 62 described above) to the user device 52 providing panel switching rate configuration parameters to the user device 52. In response to the first message 91, the user device 52 determines a panel switching rate (in operation 92—similar to the operation 63 described above). As discussed further below, the first message 91 may include instructing the user device 52 to continue to determine the panel switching rate during an idle mode of operation.

Two-way communications occur between the communication node 51 and the user device 52, as indicated by the messages 93. The two-way communications may include the sending of one or more panel switching rate messages from the user device 52 to the communication node 51.

The messages 93 may be sent as part of an RRC connected mode of operation. At operation 94, the user device 52 enters an idle mode of operation (e.g. an RRC IDLE mode of operation).

The operation 94 may include determining whether to continue to determine the panel switching rate during an idle mode of operation, depending on an idle mode configuration setting (which configuration setting may be included in parameters provided in the first message 91).

In the example message sequence 90, user device panel switching monitoring is continued in an idle mode of operation. Here, a panel switching event is counted if the user device 52 changes the best panel for potential communication with its camping cell (e.g. the panel it will use for cell re-selection, for reception of paging messages, use for random access request in case the UE initiate call establishment). As illustrated, the user device (while operating in a connected mode) will be configured by the network to perform panel switching rate measurements also while in the idle mode. The network may configure the user device to use different (or the same) parameter settings for panel switching rate measurements in the idle and connected modes of operation.

In the message sequence 90, the user device 52 sends a message 95 to the communication node 51 to transition from the idle mode to the connected mode (e.g. transitioning from an RRC IDLE mode to an RRC connected mode). As part of the message 95 (e.g. during call setup), the latest panel switching rate is provided by the user device to the communication node. Thus, the user device 52 provides the panel switching rate report to the communication node 51 on exiting the idle mode of operation.

The communication node 51 can therefore take the panel switching rate into account when configuring the link for the user device (e.g. beams, RRC parameters, RRM settings, etc.).

Following the message 95, two-way communications are resumed between the user device 52 and the communication node 51, as represented by the messages 96. As with the messages 93, the two-way communications 96 may include the sending of one or more panel switching rate messages from the user device 52 to the communication node 51 (e.g. periodically, or based on events, as defined in the parameters provided in the message 91).

Figure 10:
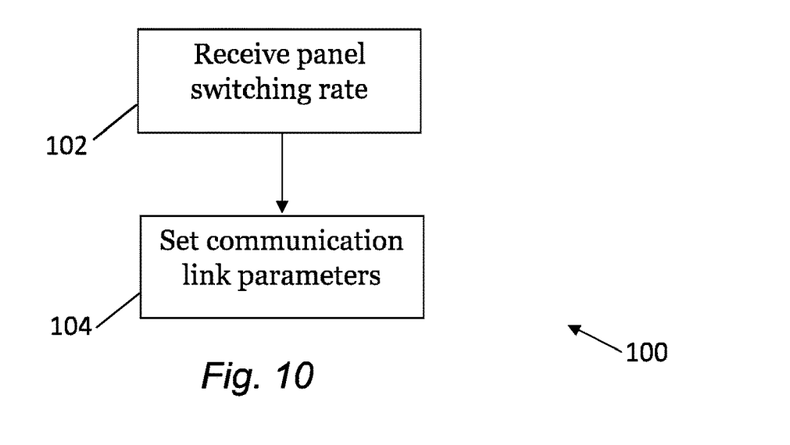
FIG. 10 is a flow chart showing an algorithm in accordance with an example embodiment.

FIG. 10 is a flow chart showing an algorithm, indicated generally by the reference numeral 100, in accordance with an example embodiment. The algorithm 100 may be implemented at the network node 32 or the communication node 51 (or some similar node).

The algorithm 100 starts at operation 102, where a panel switching rate is received from a user device (for example at the network node 32 or the communication node 51). In response, communication link parameters (e.g. for communications between the respective user device and the network node or communication node) are set and provided to the user device in operation 104.

Thus, parameters for a communication links between a network node and one or more user devices can be set based on received panel switching rate information from the respective user devices. The parameters may include one or more of: scaling of parameters for RRM measurement objects; settings for beam management procedures; hysteresis values; and timing parameters of RRM measurement objects.

In setting the parameters, the network may be able to configure the user device to scale some of its parameters as functions of the panel switching. For example, the user device may be configured to scale parameters of RRM Measurement Objects used to trigger handovers, such as the TTT and A3 threshold. This may, for example, be realized by configuring the user device to scale TTT with a factor X and A3 with a factor Y if the panel switching rate is within a certain range. This may be useful to avoid undesirable handover ping-pings due to fast user device panel switching behaviors by using longer TTT and higher A3 threshold (as compared to user devices with slower panel switching rates). In another example, the network may configure the user device to scale the T310 (used by the user device for RLF declaration) as a function of the panel switching rate.

In the table below, we have summarized possible impacts on the 3GPP NR specifications by incorporating the principles described herein into that standard. Notice that the pointers to specific sections in current specifications is indicative only, and as there could be other alternatives for including the presented ideas in specifications.

| Description | Anticipated 3GPP NR spec. impact |
|---|---|
| Configuration of the UE to perform panel switching rate measurements, including related parameters and reporting conditions.<br>The gNB may configure, jointly or separately, panel switching rate measurements for the UE to perform in IDLE and Connected mode, respectively.<br>The UE may be configured to also report the recently used panels IDs during the sliding window length. | Propose to include in RRC specifications as a new Measurement Object. Could fit into Section 5.5 in 3GPP TS 38.331. The new panel switching rate measurement object could include a parameter for the sliding window length (e.g. expressed in number of seconds, radio frames, or other time measures). Moreover, corresponding reporting conditions may be included in the measurement object. Those may include periodic reporting and options for event-based reporting, e.g. if the panel switching rate changes a certain level, or if the panel switching rate exceeds (or declines) certain parameterized thresholds. RRC measurement reporting may be included in Section 5.5.5 in 3GPP TS 38.331. The panel switching rate measurement object may also include an information element expressing whether it applies to both RRC IDLE and RRC Connected Mode, or only while in Connected mode. |
| New signaling for the gNB to request a UE to feedback its current panel switching rate | This may be a new procedure that could be added to the RRC specifications, for example under Section 5 (general procedures) in 3GPP TS 38.331. |
| New signaling from the gNB to the UE to instruct the UE to report its latest panel switching rate measurement on the next call establishment (e.g. on transition from IDLE to Connected mode) | RRC connection establishment is captured in 3GPP TS 38.331 Section 5.3.3. That section may be updated with new functionality/procedure for the UE to report the latest panel switching rate measurement it has recorded while in IDLE. |
| New signaling from the gNB to the UE to instruct the UE to report its latest panel switching rate as part of the Beam Failure Recovery procedure. | Beam Failure Detection and Recovery procedures are captured in 38.321, Section 5.7. Thus, this section may be updated to include the new case where UE panel switching rate is included in the recovery procedure signaling to the UE.<br>Alternatively, it may be included as new RRC signaling procedures that shall immediately follow the successful beam failure recovery. |
| New signaling from the gNB to the UE to instruct the UE to report its latest panel switching rate as part of the Radio Link Failure Recovery procedure. | Radio link failure related actions are captured in 3GPP TS 38.331 Section 5.3.10, while related RRC Connection Re-establishment and Resume is in Sections 5.3.7 and 5.3.13, respectively. Those sections may be enhanced by new possibilities for having the UE report panel switching rate upon RRC Connection Resume/Successful Re-Establishment. |
| New gNB-2-UE signaling to configure the UE to scale selected parameters of RRM measurement objects as a function of the UEs panel switching rate. Examples include scaling the A3 threshold and/or TTT to e.g. avoid unnecessary handovers as a result of frequent UE antenna panel switching. | The RRM measurement reporting events are described in 3GPP TS 38.331 Section 5.5.4. Text on this section may be expanded by including new options where e.g. the A3 hysteresis and/or TTTI is scaled as a function of the UEs current panel switching rate. |
| New gNB-2-UE signaling to configure the UE to scale selected parameters used for beam failure declaration and/or radio link failure declaration as a function of the UEs panel switching rate. The network controls how much scaling the UE can apply. | This could include new scaling of timers/counters such as T301, T310, T311 and constants N310, N311, as a function of panel switching rate (3GPP TS 38.331 Section 5.3.5.5.6). |

Figure 11:
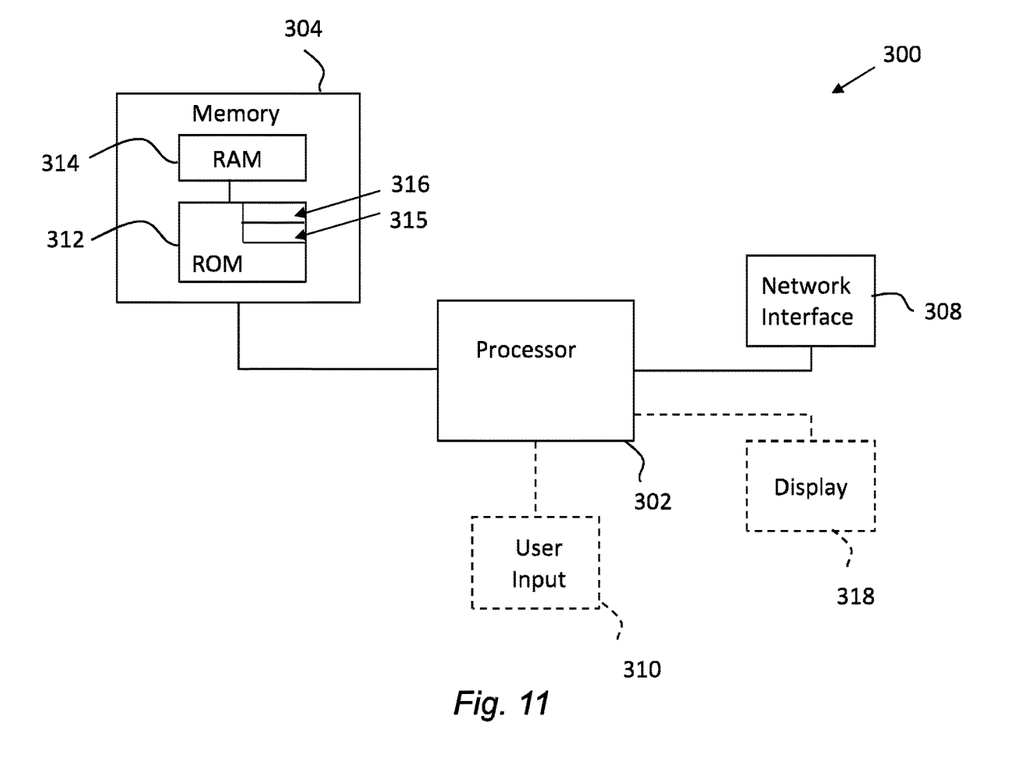
FIG. 11 is a block diagram of components of a system in accordance with an example embodiment.

For completeness, FIG. 11 is a schematic diagram of components of one or more of the example embodiments described previously, which hereafter are referred to generically as a processing system 300. The processing system 300 may, for example, be the apparatus referred to in the claims below.

The processing system 300 may have a processor 302, a memory 304 closely coupled to the processor and comprised of a RAM 314 and a ROM 312, and, optionally, a user input 310 and a display 318. The processing system 300 may comprise one or more network/apparatus interfaces 308 for connection to a network/apparatus, e.g. a modem which may be wired or wireless. The network/apparatus interface 308 may also operate as a connection to other apparatus such as device/apparatus which is not network side apparatus. Thus, direct connection between devices/apparatus without network participation is possible.

The processor 302 is connected to each of the other components in order to control operation thereof.

The memory 304 may comprise a non-volatile memory, such as a hard disk drive (HDD) or a solid state drive (SSD). The ROM 312 of the memory 304 stores, amongst other things, an operating system 315 and may store software applications 316. The RAM 314 of the memory 304 is used by the processor 302 for the temporary storage of data. The operating system 315 may contain code which, when executed by the processor implements aspects of the algorithms or message sequences 20, 40, 50, 60, 70, 80, 90 and 100 described above. Note that in the case of small device/apparatus the memory can be most suitable for small size usage i.e. not always a hard disk drive (HDD) or a solid state drive (SSD) is used.

The processor 302 may take any suitable form. For instance, it may be a microcontroller, a plurality of microcontrollers, a processor, or a plurality of processors.

The processing system 300 may be a standalone computer, a server, a console, or a network thereof. The processing system 300 and needed structural parts may be all inside device/apparatus such as IoT device/apparatus i.e. embedded to very small size.

In some example embodiments, the processing system 300 may also be associated with external software applications. These may be applications stored on a remote server device/apparatus and may run partly or exclusively on the remote server device/apparatus. These applications may be termed cloud-hosted applications. The processing system 300 may be in communication with the remote server device/apparatus in order to utilize the software application stored there.

Figure 12A:
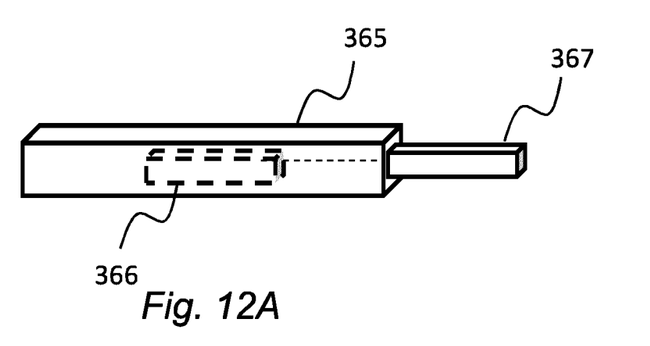
FIGS. 12A and 12B show tangible media, respectively a removable non-volatile memory unit and a company disc (CD) storing computer-readable code which when run by a computer perform operations according to example embodiment.
Figure 12B:
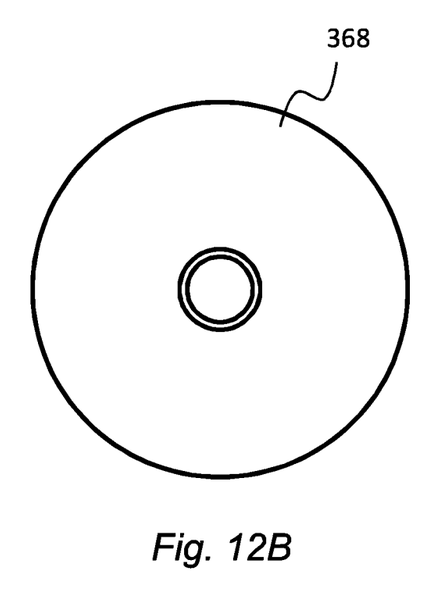

FIGS. 12A and 12B show tangible media, respectively a removable memory unit 365 and a compact disc (CD) 368, storing computer-readable code which when run by a computer may perform methods according to example embodiments described above. The removable memory unit 365 may be a memory stick, e.g. a USB memory stick, having internal memory 366 storing the computer-readable code. The internal memory 366 may be accessed by a computer system via a connector 367. The CD 368 may be a CD-ROM or a DVD or similar. Other forms of tangible storage media may be used. Tangible media can be any device/apparatus capable of storing data/information which data/information can be exchanged between devices/apparatus/network.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices/apparatus and other devices/apparatus. References to computer program, instructions, code etc. should be understood to express software for a programmable processor firmware such as the programmable content of a hardware device/apparatus as instructions for a processor or configured or configuration settings for a fixed function device/apparatus, gate array, programmable logic device/apparatus, etc.

If desired, the different functions discussed herein may be performed in a different order and/or concurrently with each other. Furthermore, if desired, one or more of the above-described functions may be optional or may be combined. Similarly, it will also be appreciated that the flow diagrams or message sequence sequences of FIGS. 2 and 4 to 10 are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described example embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. An apparatus comprising:
   at least one processor; and
   at least one memory including computer program code;
   the at least one memory and the computer program code configured to, with the at least one processor, cause the apparatus at least to:
   receive antenna panel switching rate configuration parameters;
   determine an antenna panel switching rate at a user device of a communication system, wherein the antenna panel switching rate is based on a number of antenna panel switching events within a moving averaging window, wherein the moving average window has a size defined by said configuration parameters; and
   provide a panel switching rate report to a network node of the communication system, wherein the panel switching rate report includes the determined antenna panel switching rate.

2. The apparatus as claimed in claim 1,
   wherein the computer program code and the at least one processor configured to cause the apparatus to provide comprises the computer program code and the at least one processor configured to cause the apparatus to:
   provide the panel switching rate report in response to a panel switching rate request from the network node.

3. The apparatus as claimed in claim 1, wherein the computer program code and the at least one processor configured to cause the apparatus to provide comprises the computer program code and the at least one processor configured to cause the apparatus to:

provide the panel switching rate report in the event that a beam failure recovery or a reestablishment attempt is initiated.

4. The apparatus as claimed in claim 1, wherein the panel switching rate report identifies a most recently used user device antenna panel and/or a most frequently used user device antenna panel.

5. The apparatus as claimed in claim 1, wherein the computer program code and the at least one processor are further configured to cause the apparatus to:

determine whether to continue to determine the antenna panel switching rate during an idle mode of operation, depending on an idle mode configuration setting.

6. The apparatus as claimed in claim 5, wherein the computer program code and the at least one processor are further configured to cause the apparatus to:

provide the panel switching rate report to the network node on exiting said idle mode of operation.

7. The apparatus as claimed in claim 1, wherein said antenna panel switching rate configuration parameters include one or more reporting requirements, wherein the respective user device is instructed to send a panel switching rate report in the event that one or more of said reporting requirements are met.

8. The apparatus as claimed in claim 1, wherein the computer program code and the at least one processor are further configured to cause the apparatus to:

perform setting a user device preferred panel identifier to a most frequently used antenna panel for the respective user device.

9. The apparatus comprising:
at least one processor; and
at least one memory including computer program code;
the at least one memory and the computer program code configured to, with the at least one processor, cause the apparatus at least to:
provide antenna panel switching rate configuration parameters to one or more user devices of a communication system, wherein said configuration parameters include a moving averaging window size of a moving average window, wherein during the moving average window a number of antenna panel switching events is to be counted at the respective user device; and receive one or more panel switching rate reports from one or more of said user devices, wherein each panel switching rate report includes a determined antenna panel switching rate for the respective user device.

10. The apparatus as claimed in claim 9, wherein the computer program code and the at least one processor are further configured to cause the apparatus to:

determine whether an action is required in response to said one or more received panel switching rate reports.

11. The apparatus as claimed in claim 7, wherein the computer program code and the at least one processor are further configured to cause the apparatus to:

send a panel switching rate report request to one or more of said one or more user devices.

12. The apparatus as claimed in claim 9, wherein the computer program code and the at least one processor are further configured to cause the apparatus to:

instruct one or more of said user devices to continue to determine the antenna panel switching rate during an idle mode of operation.

13. The apparatus as claimed in claim 9, wherein the computer program code and the at least one processor are further configured to cause the apparatus to:

set parameters for a communication link with one of said one or more user devices based on received antenna panel switching rate information from the respective user device.

14. The apparatus as claimed in claim 13, wherein the parameters for the communication link include one or more of: scaling of parameters for RRM measurement objects; settings for beam management procedures; and hysteresis values; and timing parameters of RRM measurement objects.

15. A method comprising:
receiving antenna panel switching rate configuration parameters;
determining an antenna panel switching rate at a user device of a communication system, wherein the antenna panel switching rate is based on a number of antenna panel switching events within a moving averaging window, wherein the moving average window has a size defined by said configuration parameters; and
providing a panel switching rate report to a network node of the communication system, wherein the panel switching rate report includes the determined antenna panel switching rate.

* * * * *